(12) United States Patent
Kumar et al.

(10) Patent No.: US 11,847,598 B2
(45) Date of Patent: Dec. 19, 2023

(54) METHOD AND SYSTEM FOR ANALYZING PROCESS FLOWS FOR A PROCESS PERFORMED BY USERS

(71) Applicant: EdgeVerve Systems Limited, Bangalore (IN)

(72) Inventors: Sandeep Kumar, Bangalore (IN); Guha Ramasubramanian, Bangalore (IN); Amrutha Bailuri, Bangalore (IN); Deepinder Dhuria, Karnal (IN); Sphurti Rajesh Pendke, Pune (IN)

(73) Assignee: Edgeverve Systems Limited, Bangalore (IN)

( * ) Notice: Subject to any disclaimer, the term of this patent is extended or adjusted under 35 U.S.C. 154(b) by 40 days.

(21) Appl. No.: 17/568,794

(22) Filed: Jan. 5, 2022

(65) Prior Publication Data
US 2023/0052034 A1  Feb. 16, 2023

(51) Int. Cl.
*G06Q 10/0633* (2023.01)
*G06Q 10/0639* (2023.01)

(52) U.S. Cl.
CPC ... *G06Q 10/0633* (2013.01); *G06Q 10/06393* (2013.01)

(58) Field of Classification Search
CPC .................... G06Q 10/0633; G06Q 10/06393
See application file for complete search history.

(56) References Cited

U.S. PATENT DOCUMENTS

| | | | | |
|---|---|---|---|---|
| 6,029,195 A | * | 2/2000 | Herz | H04N 21/25891 |
| | | | | 348/E7.071 |
| 10,902,384 B2 | * | 1/2021 | Polli | G09B 7/02 |
| 11,037,079 B2 | * | 6/2021 | Hancock | G06Q 50/2057 |
| 2002/0040313 A1 | * | 4/2002 | Hunter | G06Q 10/06 |
| | | | | 705/7.13 |

(Continued)

FOREIGN PATENT DOCUMENTS

| CA | 3080240 A1 * | 5/2018 | ......... G06F 11/3051 |
|---|---|---|---|
| CN | 106611239 A * | 5/2017 | |

OTHER PUBLICATIONS

Bergmann et al. "Workflow Clustering Using Semantic Similarity Measures" (2012) (retrieved from http://www.wi2.uni-trier.de/shared/publications/2013_BergmannMuellerWittkowskyKI.pdf) (Year: 2012).*

*Primary Examiner* — Sujay Koneru
(74) *Attorney, Agent, or Firm* — Troutman Pepper Hamilton Sanders LLP

(57) ABSTRACT

The present disclosure relates to a method for determining optimal process flow (107) for a process performed by users (101) in a computing system. The method comprises receiving plurality of keystroke level events for each of plurality of process flows associated with the process, performed by plurality of users (101). Further, the method comprises determining one or more subtasks (105) for each of the plurality of process flows (102). A subtask comprises a set of events occurring together in the plurality of keystroke level events (103). Furthermore, the method comprises grouping one or more process flows from the plurality of process flows (102) to form one or more clusters (106), (Continued)

based on the one or more subtasks (105). Each cluster comprises the one or more process flows with similar subtasks. Thereafter, the method comprises determining an optimal process flow (107) in each cluster.

21 Claims, 6 Drawing Sheets

(56)  References Cited

U.S. PATENT DOCUMENTS

| | | | | |
|---|---|---|---|---|
| 2005/0022168 A1* | 1/2005 | Zhu | G16B 40/00 | 717/124 |
| 2006/0075335 A1* | 4/2006 | Gloor | G06T 11/206 | 715/273 |
| 2006/0095521 A1* | 5/2006 | Patinkin | G06Q 10/107 | 709/206 |
| 2007/0199047 A1* | 8/2007 | Gibart | G06F 21/32 | 726/2 |
| 2007/0299631 A1* | 12/2007 | Macbeth | G06F 11/3476 | 702/182 |
| 2008/0183536 A1* | 7/2008 | Hirabayashi | G06Q 10/06 | 382/100 |
| 2008/0288312 A1* | 11/2008 | Miles | G06Q 30/02 | 705/7.34 |
| 2009/0089078 A1* | 4/2009 | Bursey | G06Q 30/0281 | 382/293 |
| 2009/0171990 A1* | 7/2009 | Naef, III | G06Q 10/06 | |
| 2009/0287617 A1* | 11/2009 | Schmidt | G06Q 10/06 | 706/11 |
| 2010/0010853 A1* | 1/2010 | Yano | G06Q 10/0633 | 345/440 |
| 2010/0174583 A1* | 7/2010 | Passova | G06Q 10/0633 | 705/348 |
| 2011/0106577 A1* | 5/2011 | Nakazato | G06Q 10/0633 | 705/7.27 |
| 2012/0062574 A1* | 3/2012 | Dhoolia | G06V 30/422 | 345/506 |
| 2013/0070056 A1* | 3/2013 | Tripathi | G06Q 10/06 | 382/104 |
| 2013/0159904 A1* | 6/2013 | Kelappan | G06F 3/0481 | 715/769 |
| 2014/0180753 A1* | 6/2014 | Scerrato | G06Q 10/0633 | 705/7.27 |
| 2014/0297662 A1* | 10/2014 | Wu | G06F 16/245 | 707/754 |
| 2014/0359695 A1* | 12/2014 | Chari | G06F 21/604 | 726/1 |
| 2015/0131850 A1* | 5/2015 | Qvarfordt | G06T 7/74 | 382/103 |
| 2015/0278742 A1* | 10/2015 | Hale | G06F 16/285 | 705/7.37 |
| 2016/0162478 A1* | 6/2016 | Blassin | G06Q 10/0631 | 706/12 |
| 2017/0070527 A1* | 3/2017 | Bailey | H04L 67/02 | |
| 2018/0129988 A1* | 5/2018 | O'Connell de la Flor | G16H 40/20 | |
| 2018/0293393 A1* | 10/2018 | Effendi | G06F 21/32 | |
| 2020/0050529 A1* | 2/2020 | Balasubramanian | G06F 11/3438 | |
| 2020/0151634 A1* | 5/2020 | Cinnor | G06N 20/00 | |
| 2020/0293540 A1* | 9/2020 | Isahagian | G06F 16/2246 | |
| 2020/0311681 A1* | 10/2020 | Putnam | G06Q 30/04 | |
| 2021/0027883 A1* | 1/2021 | Kumar | G16H 40/20 | |
| 2021/0215788 A1* | 7/2021 | Hu | G01S 13/56 | |
| 2022/0043668 A1* | 2/2022 | Alibhai | G06Q 10/063 | |
| 2022/0138568 A1* | 5/2022 | Smolyanskiy | G06N 3/044 | 706/21 |
| 2022/0188702 A1* | 6/2022 | Kashif | G06N 20/00 | |
| 2022/0224683 A1* | 7/2022 | Solano Gomez | G06N 20/00 | |

\* cited by examiner

METHOD AND SYSTEM FOR ANALYZING PROCESS FLOWS FOR A PROCESS PERFORMED BY USERS

This application claims the benefit of Indian Patent Application Serial No. 202141036838, filed Aug. 13, 2021, which is hereby incorporated by reference in its entirety.

TECHNICAL FIELD

The present disclosure generally relates to process mining. More particularly, the present disclosure relates to a method and a system for analyzing process flows for a process performed by users.

BACKGROUND

Process mining involves extracting knowledge from event logs related to processes in computing systems. The event logs include data generated by the computing systems in domains such as finance, IT, healthcare, and the like. Process mining offers fact-based insights that help to audit, analyze, and improve the processes. These processes are sequence of actions performed by the users. The number of processes performed by the users in the computing systems is increasing with an increase in implementation of the computing systems in most of the domains. The large number of processes are difficult to analyze for a user and is time-consuming. Hence, the process mining aims to provide analyzed data to the user in an abstract form. The analyzed data is presented to the user in the abstract form such that the analyzed data is understandable to the users. Also, the analyzed data in the abstract form enables the user in easy decision-making.

Conventional systems to analyze the processes performed by the user comprise performing Business Process Re-engineering (BPR). The data associated with the processes performed by the user is captured from log management tools. The data captured from the log management data is an abstract form of data. The abstract form of data refers to the data with lower level of detailing of the processes. The abstract form of data is aggregated and analyzed. Output of the analysis is provided to the user in the abstract form. However, the conventional techniques do not consider the data which is not in abstract form. Granular data refers to data with high level of detailing of the processes. When such granular data is analyzed, the accuracy of analysis of the processes may increase. Hence, there is need for an improved system to analyze the processes when the data is granular.

The information disclosed in this background of the disclosure section is only for enhancement of understanding of the general background of the technology and should not be taken as an acknowledgement or any form of suggestion that this information forms the prior art already known to a person skilled in the art.

SUMMARY

In an embodiment, the present disclosure discloses a method for analyzing process flows for a process performed by users in a computing system. The method comprises receiving a plurality of keystroke level events for each of plurality of process flows associated with the process. The process is performed by a plurality of users in the computing system. Further, the method comprises determining one or more subtasks for each of the plurality of process flows. A subtask from the one or more subtasks comprises a set of events occurring together in the plurality of keystroke level events of the corresponding process flow. Furthermore, the method comprises grouping one or more process flows from the plurality of process flows to form one or more clusters, based on the one or more subtasks. Each cluster from the one or more clusters comprises the one or more process flows with similar subtasks. Thereafter, the method comprises analyzing the one or more process flows to determine an optimal process flow from the one or more process flows in each cluster of the one or more clusters. The optimal process flow is determined based on a mean similarity score for each of the one or more process flows in each of the one or more clusters.

In an embodiment, the present disclosure discloses an analysis system for analyzing process flows for a process performed by users in a computing system. The analysis system comprises one or more processors and a memory. The one or more processors are configured to receive a plurality of keystroke level events for each of plurality of process flows associated with the process. The process is performed by a plurality of users in the computing system. Further, the one or more processors are configured to determine one or more subtasks for each of the plurality of process flows. A subtask from the one or more subtasks comprises a set of events occurring together in the plurality of keystroke level events of the corresponding process flow. Furthermore, the one or more processors are configured to group one or more process flows from the plurality of process flows to form one or more clusters, based on the one or more subtasks. Each cluster from the one or more clusters comprises the one or more process flows with similar subtasks. Thereafter, the one or more processors are configured to analyze the one or more process flows to determine an optimal process flow from the one or more process flows in each cluster of the one or more clusters. The optimal process flow is determined based on a mean similarity score for each of the one or more process flows in each of the one or more clusters.

As used in this summary, in the description below, in the claims below, and in the accompanying drawings, the "keystroke level events" may comprise keyboard events, mouse click events and usage of portals or applications, usage of peripherals and so on.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
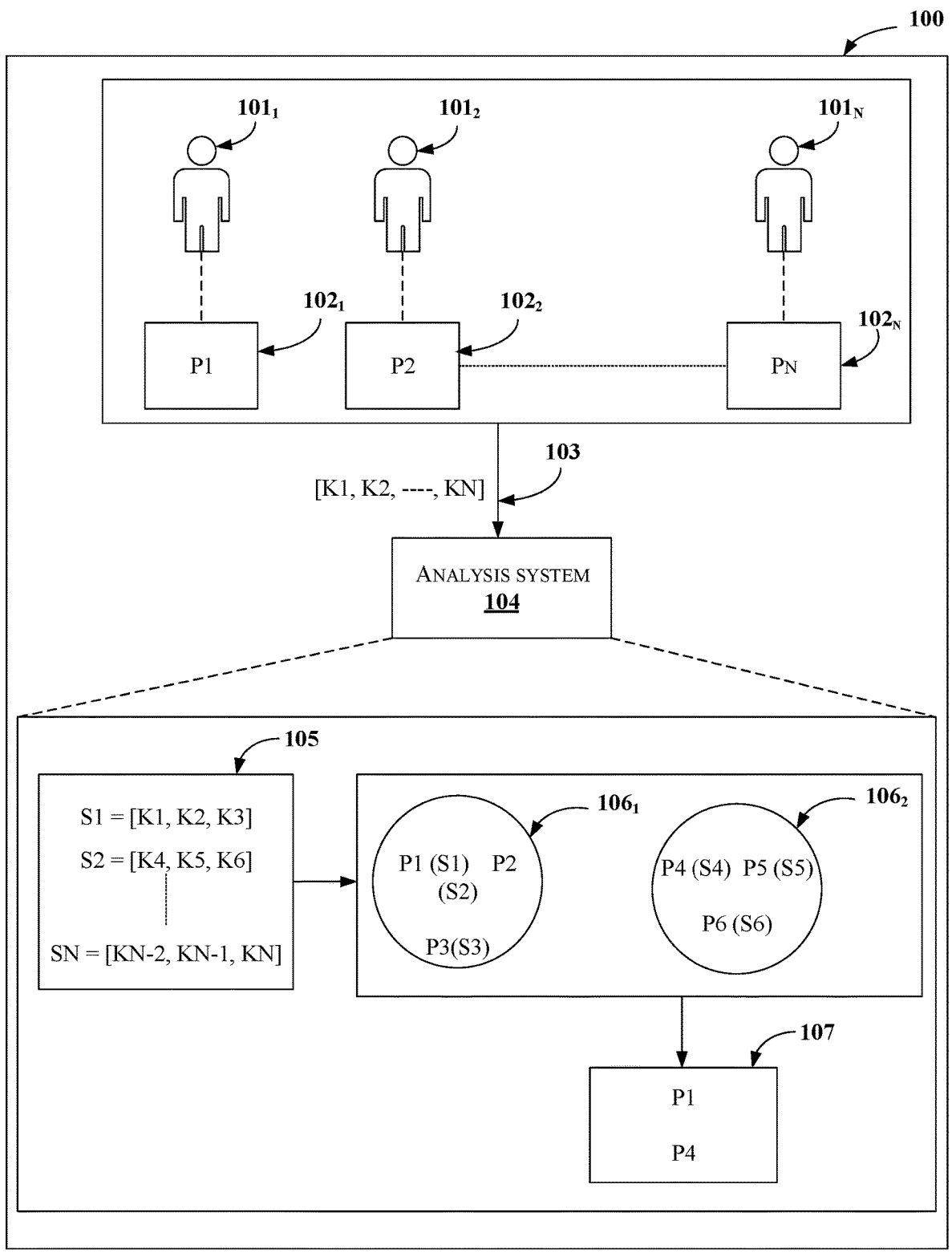
FIG. 1 illustrates an exemplary environment for analyzing process flows for a process performed by users in a computing system, in accordance with some embodiments of the present disclosure.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method for analyzing process flows for a process performed by users in a computing system. The processes comprise keystroke level events performed by the users. The process performed by each user are analyzed at granular level using the keystroke level events. Further, the method comprises determining subtasks for each of the process flows. A subtask is a set of events occurring together in the keystroke level events. Process flows are grouped to form clusters, based on the subtasks. Each cluster comprises the process flows with similar subtasks. The similarity is based on attributes associated with the subtasks, and not based on only whether the subtasks are same as each other. Hence, the similarity of the subtasks for clustering is performed by considering embedded information in the subtasks. Thus, the analysis is further granularized. Further, the method comprises analyzing the process flows to determine an optimal process flow in each cluster. The optimal process flow is determined based on a mean similarity score for each of the process flows. The optimal process flow can be analyzed to get useful insights about the process performed by each user in the computing system.

FIG. 1 illustrates an exemplary environment 100 for analyzing process flows for a process performed by users in a computing system. The exemplary environment 100 comprises a plurality of users $101_1$, $101_2$ . . . , $101_N$ and an analysis system 104. The plurality of users $101_1$, $101_2$ . . . , $101_N$ is referred as the plurality of users 101 in the present description. A flow associated with each of the plurality of users 101, for performing the process, is termed as a process flow. Further, a process flow P1 performed by a user $101_1$ is represented as $102_1$. Similarly, a process flow P2 performed by a user $101_2$ is represented as $102_2$. A process flow PN is performed by a user $101_N$ is represented as $102_N$. A plurality of process flows P1, P2, . . . .PN associated with each of the plurality of processes performed by the plurality of users 101 flows is referred as the plurality of process flows 102 in the present description. The plurality of users 101 may perform the plurality of process flows 102 in the computing system (not shown in the figures). The computing system may be a laptop, computer, a desktop computer, a Personal Computer (PC), a smartphone, a tablet, e-book readers, a server, a network server, a cloud-based server, and the like. The computing system may be associated with a hardware. For example, the computing system may be associated with a printer. In an example, the plurality of users 101 may be employees of an organization. Each of the plurality of users 101 may be associated with corresponding process flow from the plurality of process flows 102 for performing the process in their respective laptops. Consider, a process may be a billing process. A process flow $102_1$ associated with a user $101_1$ for performing the billing process may be reviewing billing information of an activity, prepare the invoice of the activity, print invoice of the activity, and send invoice of the activity. A process flow $102_2$ associated with a user $101_2$ for performing the billing process may be reviewing billing information of one or more activities, prepare invoices, print invoice batch, and send invoices. Similarly, the user $101_2$ may perform the billing process for other activities. The plurality of process flows 102 may be different for each of the plurality of users 101. Further, the plurality of process flows 102 associated with each of the plurality of users 101 may be in different order.

The analysis system 104 may receive a plurality of keystroke level events for each of the plurality of process flows 102 associated with the process. The plurality of keystroke level events is represented as K1, K2, . . . . KN. The plurality of keystroke level events is referred as the plurality of keystroke level events 103 in the present description. The plurality of keystroke level events 103 may be each activity performed in each process flow associated with the plurality of users 101. The plurality of keystroke level events 103 may comprise keyboard events, mouse click events and usage of portals or applications, usage of peripherals and so on. For the example provided previously, the plurality of keystroke level events 103 of the user $101_1$ for performing the billing process, may include usage of an invoice portal, clicking of an icon in the invoice portal to generate an invoice, usage of a printer, and usage of an email application. Further, the analysis system 104 determines one or more subtasks S1, S2, SN for each of the plurality of process flows 102. The one or more subtasks S1, S2, SN is referred as the one or more subtasks 105. A subtask from the one or more subtasks 105 may comprise a set of events occurring together in the plurality of keystroke level events 103 of the corresponding process flow. For example, a subtask S1 may include K1, K2, K3 since the events are performed together in a sequence and are repeated in the process flow. The events K1, K2, K3 may be performed by one or more users among the plurality of users 101. Similarly, a subtask S2 may be K4, K5, K6.

Furthermore, the analysis system 104 may be configured to group one or more process flows from the plurality of process flows 102 to form one or more clusters 106. The grouping may be based on the one or more subtasks 105. Each cluster from the one or more clusters 106 comprises the one or more process flows with similar subtasks. For example, one or more process flows P1, P2, and P3 may be grouped as a cluster $106_1$. The grouping may be performed, since one or more subtasks S1, S2, and S3 may be similar. The one or more subtasks S1, S2, and S3 may be determined to be similar based on attributes associated with each event in the set of events of each of the one or more subtasks 105. For example, an event in the set of events in S1 may be usage of a user portal. An attribute related to the event may be execution time when using the user portal. The execution time of each event in subtask S2 and S3 may be determined. The one or more subtasks S1, S2, and S3 may be determined to be similar when the execution time of each event in the one or more subtasks S1, S2, and S3 is approximately equal. Further, each of the one or more subtasks S1, S2, and S3 may be determined to be similar based on a type of the event. The type of the event may be one of, a keyboard event and a mouse-click event. For example, the type of the set of events in the subtask S1 and S2 may be determined as the keyboard event. The subtasks S1 and S2 may be determined to be similar based on the determination. In another example, the number of keyboard events associated with an event in the subtask S1 may be 3. The number of mouse-click events associated with the event in the subtask S1 may be 2. The number of keyboard events associated with an event in the subtask S2 may be 3. The number of mouse-click events associated with the event in the subtask S1 may be 0. Further, an application on which the event associated with the subtask S1 and S2 is performed may be a user portal. The subtasks S1 and S2 may be determined to be similar subtasks based on similarity in the application. Similarly, one or more process flows P4, P5, and P6 may be grouped as a cluster $106_2$. The grouping may be performed, since one or more subtasks S4, S5, and S6 may be similar. Further, the analysis system 104 may analyze the one or more process flows to determine an optimal process flow 107 from the one or more process flows in each cluster of the one or more clusters 106. The analysis system 104 may determine the optimal process flow 107 based on a mean similarity score for a process flow in each cluster. For example, the process flow P1 may have a greater mean similarity score of the process flow than mean similarity score of other process flows. The process flow P1 may be determined as the optimal process flow 107 in the cluster 1061. Similarly, the process flow P4 may be determined as the optimal process flow 107 in the cluster $106_2$.

Figure 2:
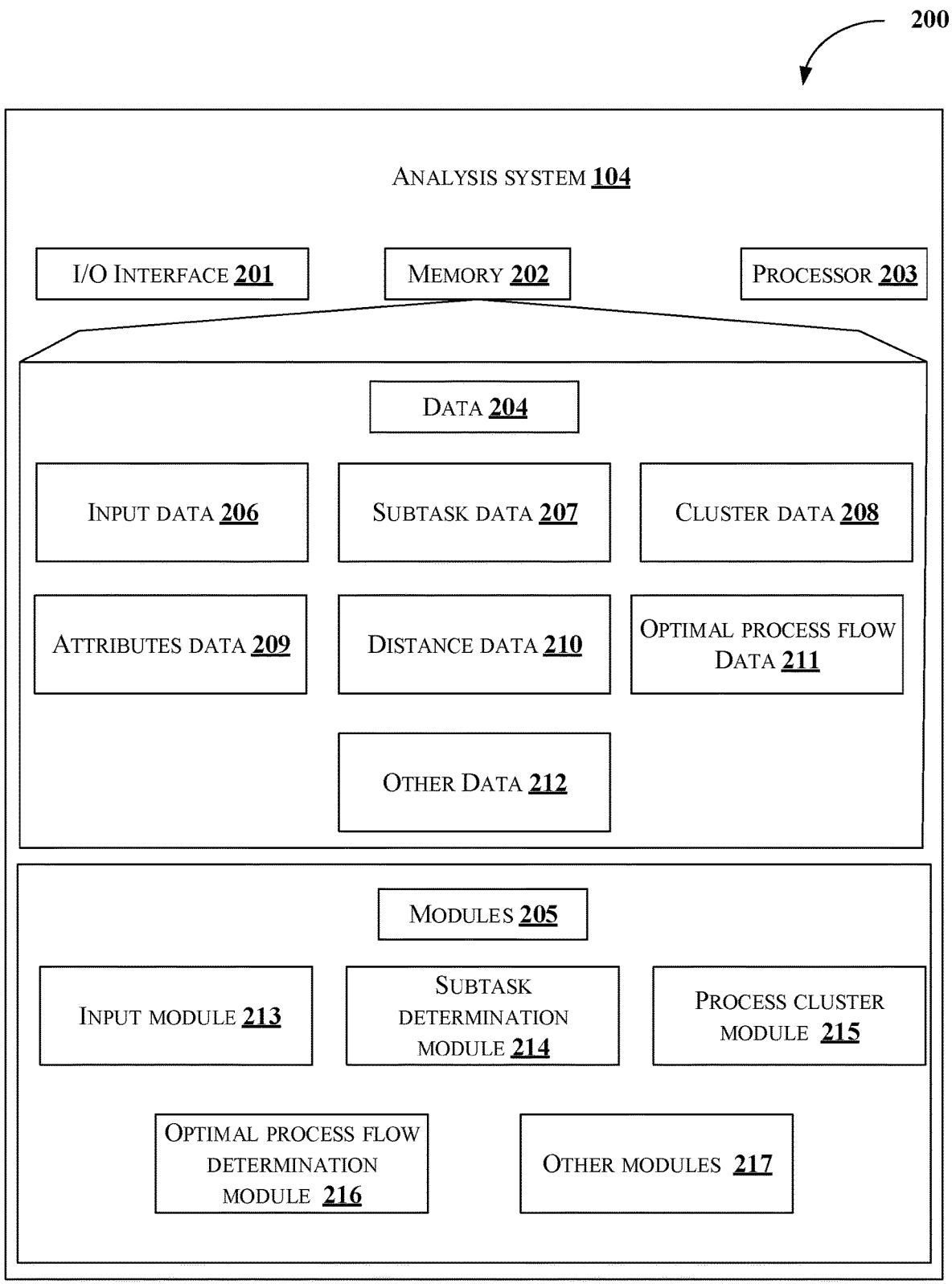
FIG. 2 illustrates an internal architecture of an analysis system for analyzing process flows for a process performed by users in a computing system, in accordance with some embodiments of the present disclosure.

FIG. 2 illustrates an internal architecture 200 of the analysis system 104 for analyzing the one or more process flows for the process performed by the plurality of users 101 in the computing system, in accordance with some embodiments of the present disclosure. The analysis system 104 may include Central Processing Units 203 (also referred as "CPUs" or "one or more processors 203"), Input/Output (I/O) interface 201, and a memory 202. In some embodiments, the memory 202 may be communicatively coupled to the processor 203. The memory 202 stores instructions executable by the one or more processors 203. The one or more processors 203 may comprise at least one data processor for executing program components for executing user or system-generated requests. The memory 202 may be communicatively coupled to the one or more processors 203. The memory 202 stores instructions, executable by the one or more processors 203, which, on execution, may cause the one or more processors 203 to analyze the one or more process flows for the process performed by the plurality of users 101 in the computing system.

In an embodiment, the memory 202 may include one or more modules 205 and data 204. The one or more modules 205 may be configured to perform the steps of the present disclosure using the data 204, to analyze the one or more process flows for the process performed by the plurality of users 101 in the computing system. In an embodiment, each of the one or more modules 205 may be a hardware unit which may be outside the memory 202 and coupled with the analysis system 104. As used herein, the term modules 205 refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide described functionality. The one or more modules 205 when configured with the described functionality defined in the present disclosure will result in a novel hardware. Further, the I/O interface 201 is coupled with the one or more processors 203 through which an input signal or/and an output signal is communicated. For example, the analysis system 104 may receive the plurality of keystroke level events 103 via the I/O interface 201. Also, the analysis system 104 may transmit the determined optimal process flow 107 via the I/O interface 201 to a user. In an embodiment, the analysis system 104, to analyze the one or more process flows for the process performed by the plurality of users 101 in the computing system, may be implemented in a variety of computing systems, such as a laptop computer, a desktop computer, a Personal Computer (PC), a notebook, a smartphone, a tablet, e-book readers, a server, a network server, a cloud-based server and the like.

In one implementation, the modules 205 may include, for example, an input module 213, a subtask determination module 214, a process cluster module 215, an optimal process flow determination module 216, and other modules 217. It will be appreciated that such aforementioned modules 205 may be represented as a single module or a combination of different modules. In one implementation, the data 204 may include, for example, input data 206, subtask data 207, cluster data 208, attributes data 209, distance data 210, optimal process flow data 211, and other data 212.

In an embodiment, the input module 213 may be configured to receive the plurality of keystroke level events 103 for each of the plurality of process flows 102. The plurality of process flows 102 may be associated with the plurality of users 101 for performing the process in the computing system. The input module 213 may receive the plurality of keystroke level events 103 from multiple computing systems. For example, the plurality of users 101 may perform the plurality of keystroke level events 103 in respective computer systems. The input module 213 may receive the plurality of keystroke level events 103 for each of the plurality of process flows 102 from the computer systems associated with the plurality of users 101. The plurality of keystroke level events 103 may be stored as the input data 206 in the memory 202.

In an embodiment, the subtask determination module 214 may receive the input data 206 from the input module 213. The subtask determination module 214 may be configured to identify a frequency of occurrence of the set of events in the plurality of keystroke level events 103. Further, the subtask determination module 214 may be configured to determine a number of events in the set of events. The subtask determination module 214 may be configured to identify the set of events to be the one or more subtasks 105 based on the frequency of occurrence, the number of events and one or more sub tasking rules. The one or more sub tasking rules comprises at least one of, an order of occurrence of the events in the set of events, occurrence of similar events prior to the set of events, occurrence of similar events subsequent to the set of events and repeatability of an event in the set of events. The set of events is identified to be the subtask when the frequency of occurrence is greater than a first pre-defined threshold value, the number of events in the set of events is greater than a second pre-defined threshold value and the one or more sub tasking rules are satisfied for the set of events. For example, the first pre-defined threshold value associated with the frequency of occurrence may be two. The second pre-defined threshold value associated with the number of events in the set of events may be two. For example, a set of events a, b, and c may occur thrice in the plurality of keystroke level events 103. The set of events a, b, and c may be identified to be a subtask, since the frequency of occurrence is three and the number of events is three. Further, the set of events a, a, b, and c may be identified to be a subtask, since the event a is repeating in the set of events. Similarly, the set of events a, b, c, d may be identified to be a subtask, since event d may be similar to event c. The one or more subtasks 105, the first pre-determined threshold value, the second pre-determined threshold value, and the one or more sub tasking rules may be stored as the subtask data 207 in the memory 202.

In an embodiment, the subtask determination module 214 may be configured to sample the plurality of keystroke level events 103 to form a plurality of sampled event sets, when a number of the plurality of keystroke level events 103 is large. A sampled event set may comprise one or more keystroke level events from the plurality of keystroke level events 103. Further, the subtask determination module 214 may be configured to determine the one or more subtasks 105 for each of the plurality of sampled event sets. The determination of the one or more subtasks 105 is performed until an optimal percentage of sub tasking is performed. For example, a number of the plurality of keystroke level events 103 may be 1,00,000. The sampled event set may comprise 3000 keystroke level events after sampling. In an example, the number of keystroke level events in the sampled event sets may be a root of a number of the plurality of keystroke level events. Two subtasks a, b, c and d, e, f may be determined in the sampled event sets. A coverage of the plurality of keystroke level events 103 determined to be the one or more subtasks 105 may be 70% after the subtasks a, b, c and d, e, f is determined. The determination of the one or more subtasks 105 may be stopped when the optimal percentage of sub tasking is performed. In an embodiment, the optimal percentage may be a user defined value.

In a second example, a number of the plurality of keystroke level events 103 may be 1,00,000. A first sampled event set comprising 125 keystroke level events may be determined. Ten subtasks may be determined in the first sampled event set. A coverage of the plurality of keystroke level events 103 determined to be the one or more subtasks 105 may be 1.4%. A second sampled event set comprising 125 keystroke level events which are different from the 125 keystroke level events associated with the first sampled event set may be determined. Ten subtasks may be determined in the second sampled event set. A coverage of the plurality of keystroke level events 103 determined to be the one or more subtasks 105 may increase to 2.6%. A third sampled event set comprising 125 keystroke level events may be determined. Ten subtasks may be determined. A coverage of the plurality of keystroke level events 103 determined to be the one or more subtasks 105 may increase to 3.7%. The process of sampling and determining the one or more subtasks 103 is continued. A $100^{th}$ sampled event set comprising 125 keystroke level events may be determined. Seven subtasks may be determined. A coverage of the plurality of keystroke level events 103 determined to be the one or more subtasks 105 may increase to 58.2%. A $500^{th}$ sampled event set comprising 125 keystroke level events may be determined. Two subtasks may be determined. A coverage of the plurality of keystroke level events 103 determined to be the one or more subtasks 105 may increase to 69.6%. A $600^{th}$ sampled event set comprising 125 keystroke level events may be determined. One subtask may be determined. A coverage of the plurality of keystroke level events 103 determined to be the one or more subtasks 105 may increase to 81.6%. A $601^{st}$ sampled event set comprising 125 keystroke level events may be determined. No subtasks may be determined. A coverage of the plurality of keystroke level events 103 may remain same i.e., 81.6%. A $602^{nd}$ sampled event set comprising 125 keystroke level events may be determined. No subtasks may be determined. A coverage of the plurality of keystroke level events 103 may remain same i.e., 81.6%. The determination of the one or more subtasks 105 may be stopped.

Further, the subtask determination module 214 may be configured to update the determined one or more subtasks 105 based on at least one of, coverage of the plurality of keystroke level events 103 in the one or more subtasks 105, average length of the one or more subtasks 105, and dissimilar events in the one or more subtasks 105. For example, the one or more subtasks 105 may be re-determined when a number of the dissimilar events in the one or more subtasks 105 is greater than a threshold value.

In an embodiment, the process cluster module 215 may be configured to receive the subtask data 207 from the subtask determination module 214. The process cluster module 215 may be configured to determine one or more attributes associated with each event in the set of events of each of the one or more subtasks 105. The one or more attributes related to an event may comprise at least one of, a type of the event (a keyboard event or mouse-click event), an execution time associated with the event, and an application on which the event is performed. For example, an event in the set of events in a subtask may be usage of a user portal. An attribute related to the event may be the execution time when using the user portal. The one or more attributes associated with each event in the set of events of each of the one or more subtasks 105 may be stored as the attributes data 209 in the memory 202. Further, the process cluster module 215 may be configured to determine a distance between each event in the set of events of a subtask and other subtasks among the one or more subtasks 105, based on a similarity of the one or more attributes. For example, two subtasks may be a, b, c and d, e, f. The process cluster module 215 may determine the distance between a and d, b and e, c and f based on the similarity of the one or more attributes related to each of the events. The distance between event a and event d may be 0 when both the events are same. The events c and f may be similar, since an application used for performing the event may be similar. For example, the distance for the events c and f may be 0.25. In an embodiment, the similarity may be associated with threshold value. For example, the threshold value may be 75%. The determined distance may be stored as the distance data 210 in the memory 202.

Further, the process cluster module 215 may be configured to group the one or more process flows when the distance between the subtasks of the one or more process flows is lesser than a pre-determined value. For example, the subtask a, b, c may be associated with a process flow 1 of user 1. The subtask d, e, f may be associated with a process flow 2 of user 2. The process flow 1 and the process flow 2 may be grouped when the distance between the subtasks is lesser than the pre-determined threshold value of 75%. The grouped one or more process flows may form the one or more clusters 106. The one or more clusters 106 may be stored as the cluster data 208 in the memory 202. Further, the process cluster module 215 may be configured to update the one or more clusters 106 based on at least one of, coverage of the one or more subtasks 105 in the one or more clusters 106, a number of the one or more clusters 106, similarity between the one or more process flows in each of the one or more clusters 106, average length associated with the one or more clusters 106, a standard deviation of the length associated with the one or more clusters 106, and inputs from a user. For example, a user may provide an input that a process flow is not similar to other process flows in a cluster. The process cluster module 215 may update the one or more clusters 106 based on the inputs from the user.

In an embodiment, the optimal process flow determination module 216 may be configured to analyze the one or more process flows in each cluster to determine the optimal process flow 107. The optimal process flow determination module 216 may be configured to pair a process flow with each of other process flows in a cluster, to form one or more process flow pairs. Further, the optimal process flow determination module 216 may determine pairwise similarity scores between process flows for each of the one or more process flow pairs in each cluster. Further, the optimal process flow determination module 216 may be configured to average the pairwise similarity scores to determine the mean similarity score for the process flow in each cluster. The mean similarity score may be determined for each process flow in each cluster. The optimal process flow determination module 216 may be configured to identify the process flow to be the optimal process flow 107 when the mean similarity score of the process flow is greater than mean similarity score of other process flows. The mean similarity score may be determined for each process flow to determine a similarity of the process flow with other process flows. When the mean similarity score of a process flow is greater than the mean similarity score of other process flows, the process flow may be determined as a best process flow. The pairwise similarity scores, the mean similarity score, and the optimal process flow 107 may be stored as the optimal process flow data 211 in the memory 202.

The other data 212 may store data, including temporary data and temporary files, generated by the one or more modules 205 for performing the various functions of the analysis system 104. The one or more modules 205 may also include the other modules 217 to perform various miscellaneous functionalities of the analysis system 104. For example, the other modules 217 may comprise a user interface to display the generated optimal process flow 107 and to receive the inputs from the user. The inputs from the user may be stored as the other data 212 in the memory 202. It will be appreciated that the one or more modules 205 may be represented as a single module or a combination of different modules.

Figure 3:
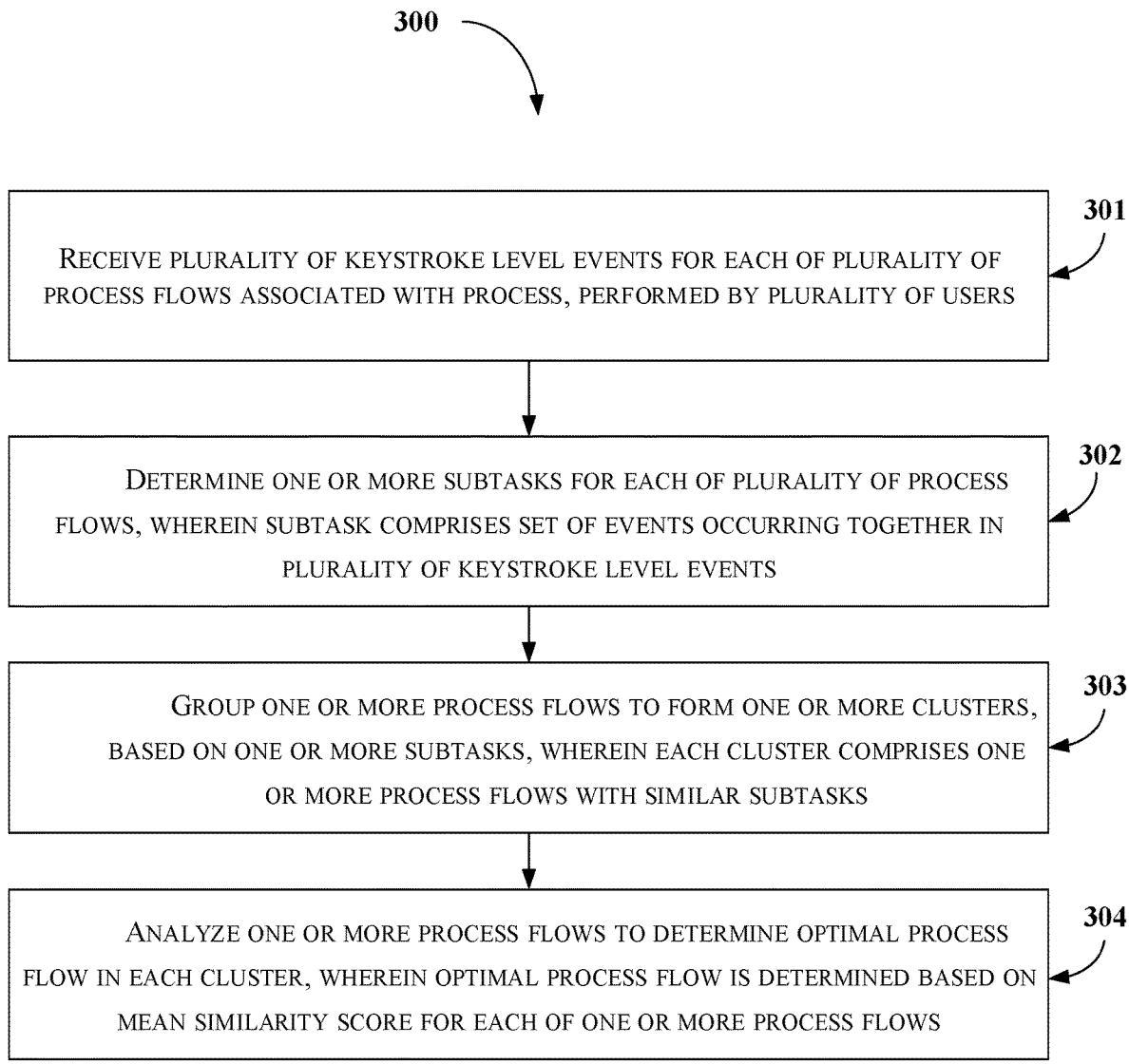
FIG. 3 shows exemplary flow chart illustrating method steps of analyzing process flows for a process performed by users in a computing system, in accordance with some embodiments of the present disclosure.

FIG. 3 shows an exemplary flow chart illustrating method steps for determining the optimal process flow 107 for the process performed by the plurality of users 101 in the computing system, in accordance with some embodiments of the present disclosure. As illustrated in FIG. 3, the method 300 may comprise one or more steps. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 301, the analysis system 104 receives the plurality of keystroke level events 103 for each of the plurality of process flows 102 associated with the process. The plurality of keystroke level events 103 may be logged in event log files in the computing system. A person skilled in the art will appreciate that the plurality of keystroke level events 103 may be received from known log management tools, any databases, and the like. The process is performed by the plurality of users 101 in the computing system. The analysis system 104 may receive the plurality of keystroke level events 103 for each of the plurality of process flows 102. The plurality of process flows 102 may be associated with the plurality of users 101 for performing the process in the computing system. The analysis system 104 may receive the plurality of keystroke level events 103 from multiple computing systems. For example, the plurality of users 101 may perform the plurality of keystroke level events in respective laptops. The analysis system 104 may receive the plurality of keystroke level events for each of the plurality of process flows 102 from the laptops associated with the plurality of users 101. Referring to example 400 of FIG. 4A, the plurality of keystroke level events 103 are represented as 401. The plurality of keystroke level events [a, b, c, d, f, g, h, a, b, c, h, f, g, h, k, a, b, c] may be received by the analysis system 104.

Figure 4A:
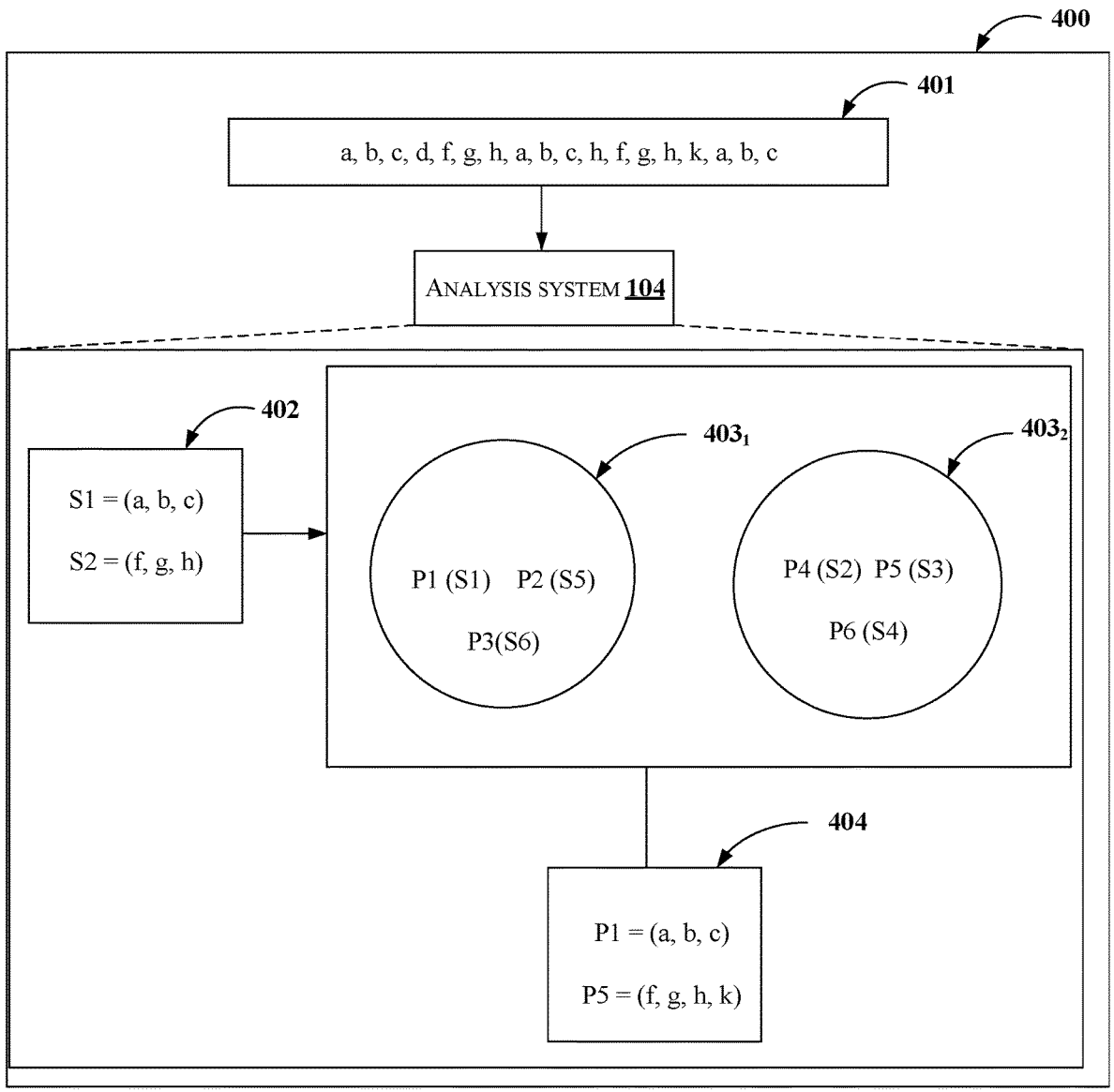
FIGS. 4A and 4B show exemplary illustrations of determining an optimal process flow for a process performed by users in a computing system, in accordance with some embodiments of the present disclosure.

Referring back to FIG. 3, at step 302, the analysis system 104 determines the one or more subtasks 105 for each of the plurality of process flows 102. A subtask from the one or more subtasks 105 comprises a set of events occurring together in the plurality of keystroke level events 103 of the corresponding process flow. The analysis system 104 may identify the frequency of occurrence of the set of events in the plurality of keystroke level events 103. Further, the analysis system 104 may determine a number of events in the set of events. The analysis system 104 may identify the set of events to be the one or more subtasks 105 based on the frequency of occurrence, the number of events and the one or more sub tasking rules. The one or more sub tasking rules may comprise at least one of, the order of occurrence of the events in the set of events, the occurrence of similar events prior to the set of events, the occurrence of similar events subsequent to the set of events and repeatability of an event in the set of events. The order of occurrence of the events may be the events occurring together in a sequence. For example, for events a, b, c, order is event "b" after event "a" and event "c" occurring after event "b". The occurrence of similar events prior to the set of events and the occurrence of similar events subsequent to the set of events be considered as one of the one or more sub tasking rules since the similar events may be similar to the set of events. For example, the set of events f, a, b, c, may be identified to be a subtask, since event f may be similar to event a. Similarly, the set of events a, b, c, d may be identified to be a subtask, since event d may be similar to event c. The repeatability of the event may be considered as one of the one or more sub tasking rules since a repeated event is same as an event in the set of events. For example, the set of events a, a, b, and c may be identified to be a subtask, since the event a is repeating in the set of events. The set of events is identified to be the subtask when the frequency of occurrence is greater than the first pre-defined threshold value, the number of events in the set of events is greater than the second pre-defined threshold value and the one or more sub tasking rules are satisfied for the set of events. Referring back to example 400 of FIG. 4A, 402 shows the one or more subtasks 105. The set of events a, b c occurring thrice in the plurality of keystroke level events 103 may be identified to be a subtask. Similarly, the set of events f, g, h may be identified to be a subtask.

In an embodiment, the analysis system 104 may sample the plurality of keystroke level events 103 to form a plurality of sampled event sets when a number of the plurality of keystroke level events 103 is large. In an embodiment, probability distribution technique may be used to perform the sampling of the plurality of keystroke level events 103. A person skilled in the art will appreciate that any known methods of sampling other than the above-mentioned technique may be used to perform the sampling of the plurality of keystroke level events 103. A sampled event set may comprise one or more keystroke level events from the plurality of keystroke level events 103. Further, the analysis system 104 may determine the one or more subtasks 105 for each of the plurality of sampled event sets. The determination of the one or more subtasks 105 is performed until an optimal percentage of sub tasking is performed. The determination of the one or more subtasks 105 may be stopped when the optimal percentage of sub tasking is performed. Further, the analysis system 104 may update the determined one or more subtasks 105 based on at least one of, coverage of the plurality of keystroke level events 103 in the one or more subtasks 105, average length of the one or more subtasks 105, and dissimilar events in the one or more subtasks 105.

Figure 4B:
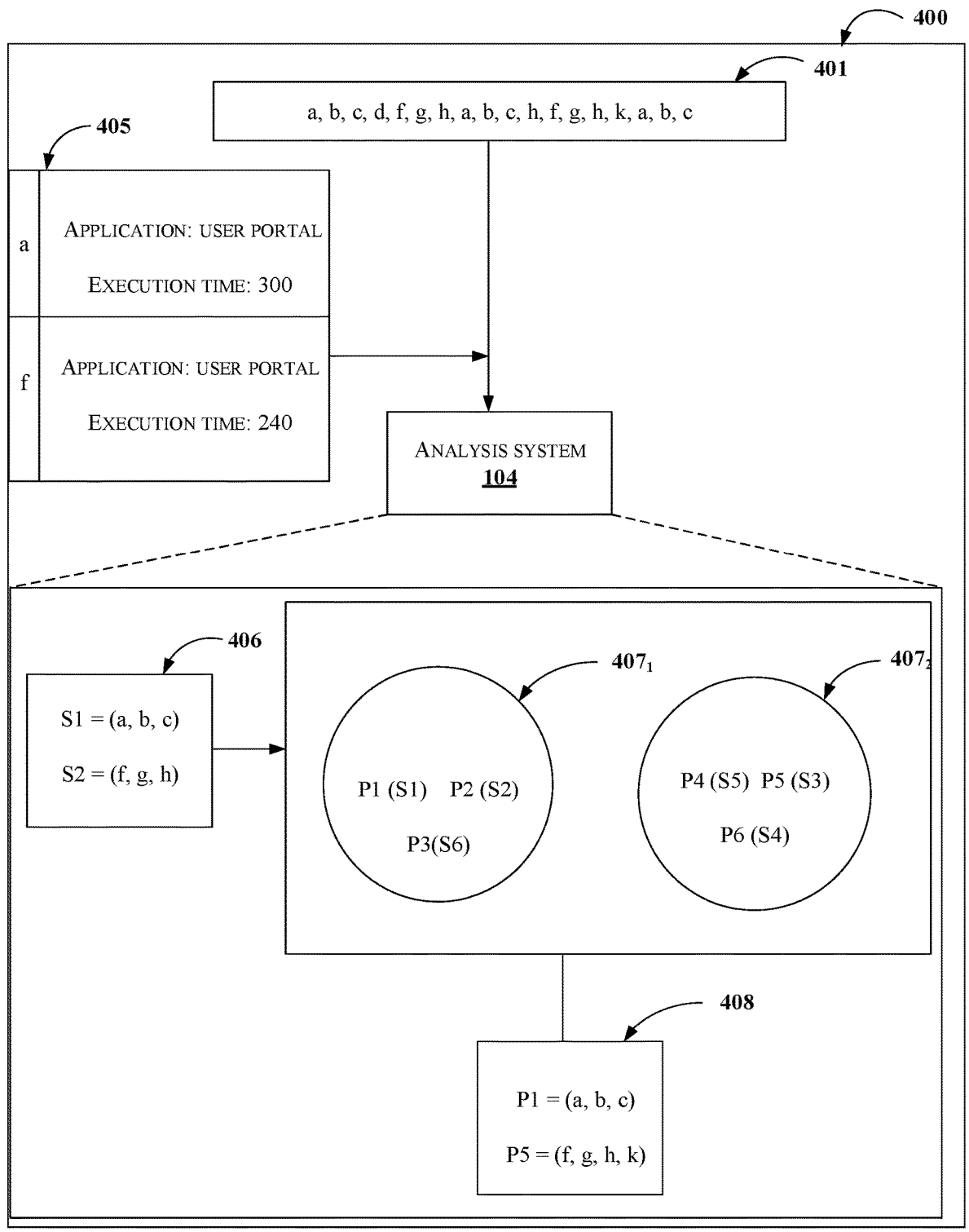

Referring back to FIG. 3, at step 303, the analysis system 104 may group the one or more process flows from the plurality of process flows 102 to form one or more clusters 106. The grouping is based on the one or more subtasks 105. Each cluster from the one or more clusters 106 comprises the one or more process flows with similar subtasks. The analysis system 104 may determine the one or more attributes associated with each event in the set of events of each of the one or more subtasks 105. In an embodiment, the one or more attributes may be determined based on information related to the set of events from the plurality of keystroke level events 103. For example, the plurality of keystroke level events 103 may be received from the event log files. The event log files may comprise the plurality of keystroke level events 103 along with the information related to the plurality of keystroke level events. In an embodiment, the plurality of keystroke level events 103 may be monitored to log the one or more attributes. The one or more attributes related to an event may comprise at least one of, a type of the event, an execution time associated with the event, and an application on which the event is performed. For example, an event in the set of events in a subtask may be usage of an email application. An attribute related to the event may be the timestamp associated with the usage of the email application. Further, the analysis system 104 may be configured to determine a distance between each event in the set of events of a subtask and other subtasks among the one or more subtasks 105, based on a similarity of the one or more attributes. A person skilled in the art will appreciated that known distance metrics such as Euclidean distance, cosine similarity, and the like may be used to determine the distance between each event in the set of events. Referring to example 400 of FIG. 4A, 406 shows two subtasks may be S1=a, b, c and S2=f, g, h. The analysis system 104 may determine the distance between a and f, b and g, c and h based on the similarity of the one or more attributes. The distance between the event a and event f may be greater than the pre-determined value. The process flow P1 associated with the subtask S1 and the process flow P2 associated with the subtask S2 may be put into different clusters 403$_1$ and 403$_2$, since the distance is greater than the pre-determined value. Referring to example 400 of FIG. 4B, the analysis system 104 may determine the subtasks S1 and S2 to be similar based on the attributes 405. An application for performing event a of the subtask S1 and event f of the subtask S2 is same. Further, an execution time for performing event a of the subtask S1 and event f of the subtask S2 is similar. The distance between the events a and f may be lesser than the pre-determined value. Hence, the process flow P1 associated with the subtask S1 and the process flow P2 associated with the subtask S2 may be put into the same clusters 407$_1$ and 407$_2$. A person skilled in the art will appreciate that any known clustering techniques such as K-nearest neighbours (KNN) may be used to form the one or more clusters 106.

Further, the analysis system 104 may update the one or more clusters 106 based on at least one of, coverage of the one or more subtasks 105 in the one or more clusters 106, a number of the one or more clusters 106, similarity between the one or more process flows in each of the one or more clusters 106, average length associated with the one or more clusters 106, a standard deviation of the length associated with the one or more clusters 106, and inputs from a user. The coverage of the one or more subtasks 105 provides indication of quality of coverage. The average length associated with the one or more clusters 106 determines efficiency of encapsulating data related to the one or more process flows. A person skilled in the art will appreciate that any known techniques to update the one or more clusters 106 may be used.

Referring back to FIG. 3, at step 304, the analysis system 104 analyzes the one or more process flows to determine the optimal process flow 107 from the one or more process flows in each cluster of the one or more clusters 106. The analysis system 104 may pair a process flow with each of other process flows, to form the one or more process flow pairs. For example, a cluster may have process flows [flow1, flow2, flow4, flow5, flow7]. Further, the analysis system 104 may determine pairwise similarity scores between process flows for each of the one or more process flow pairs. For example, the pairwise similarity scores for flow 1 with flow 2, flow 4, flow 5, and flow 7 may be 0.73, 0.67, 0.58, and 0.80, respectively. Similarly, the pairwise similarity scores for other process flows may be calculated. Further, the analysis system 104 may be configured to average the pairwise similarity scores to determine the mean similarity score for the process flow. In an embodiment, Euclidean distance determination and aggregation techniques may be used to determine the mean similarity score. A person skilled in the art will appreciate that any techniques other than the above-mentioned techniques may be used to determine the mean similarity score. The mean similarity score may be determined for each process flow in each cluster. For example, the mean similarity score for flow 1 may be (0.73+0.67+0.58 +0.80)/4=0.70. Similarly, the mean similarity scores for flow 2, flow 4, flow 5, flow 7 may be 0.74, 0.58, 0.87, and 0.67, respectively. The analysis system 104 may identify the process flow to be the optimal process flow 107 when the mean similarity score of the process flow is greater than mean similarity score of other process flows. For the above example, the highest mean similarity score is 0.87. Hence, flow 5 may be chosen as the optimal process flow 107. Referring back to FIG. 4A, 404 shows the optimal process flows as P1 and P5 for the cluster $403_1$ and $403_2$, respectively. Referring back to FIG. 4B, 408 shows the optimal process flows as P1 and P5 for the cluster $40'7_1$ and $407_2$, respectively. The optimal process flow 107 may be provided to a user for analyzing the one or more process flows. For example, the optimal process flow 107 may be provided to an employer to analyze the one or more process flows performed by employees in an organization. The employer may use the optimal process flow 107 to determine process flow followed by most of the employees in the organization and to implement the process as a standard process flow for performing the process. The analysis system 104 may analyze the one or more process flows to determine error associated each of the one or more process flows. Further, the analysis system 104 may compare the one or more process flows to gather useful insights of the one or more process flows.

COMPUTER SYSTEM

Figure 5:
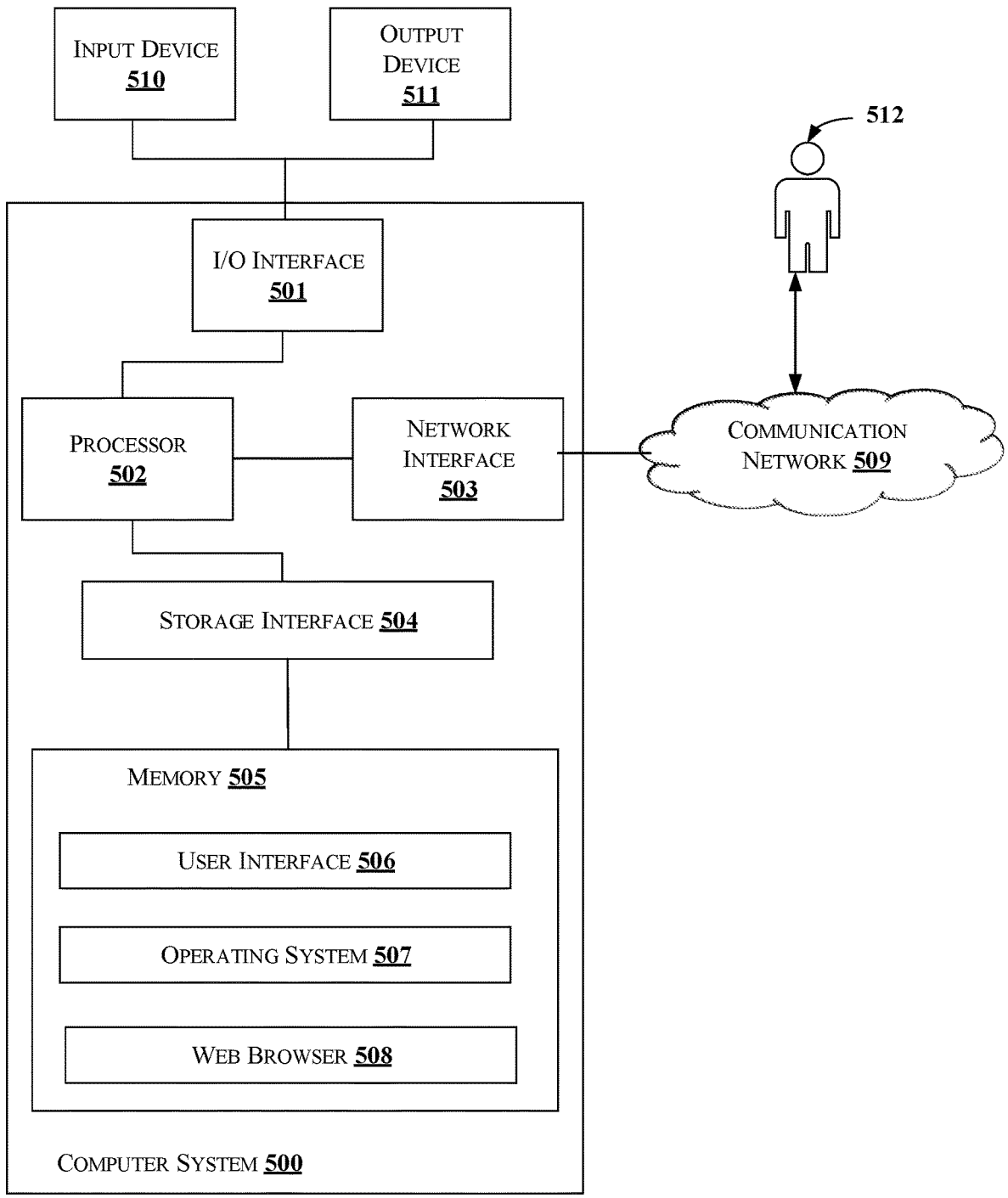
FIG. 5 shows a block diagram of a general-purpose computing system for analyzing process flows for a process performed by users in a computing system, in accordance with embodiments of the present disclosure.

FIG. 5 illustrates a block diagram of an exemplary computer system 500 for implementing embodiments consistent with the present disclosure. In an embodiment, the computer system 500 may be used to implement the analysis system 104. Thus, the computer system 500 may be used for analyzing the one or more process flows for the process performed by the plurality of users 101 in the computing system. Further, the computer system 500 may receive the inputs from the user 512 over the communication network 509. The computer system 500 may comprise a Central Processing Unit 502 (also referred as "CPU" or "processor"). The processor 502 may comprise at least one data processor. The processor 502 may include specialized processing units such as integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE (Institute of Electrical and Electronics Engineers) -1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device 510 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 511 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The computer system 500 communicates with the user 512 through a communication network 509. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507, web browser 508 etc. In some embodiments, computer system 500 may store user/application data, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH$^R$ OS X, UNIX$^R$, UNIX-like system distributions (E.G., BERKELEY SOFTWARE DISTRIBUTION™ (B SD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE$^R$ IOS™, GOOGLE$^R$ ANDROID™, BLACKBERRY$^R$ OS, or the like.

In some embodiments, the computer system 500 may implement the web browser 508 stored program component. The web browser 508 may be a hypertext viewing application, for example MICROSOFT$^R$ INTERNET EXPLORER™, GOOGLE$^R$ CHROME™°, MOZILLA$^R$ FIREFOX™, APPLE$^R$ SAFARI™, etc.

Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE$^R$ FLASH™, JAVASCRIPT™, JAVA™, Application Programming Interfaces (APIs), etc. In some embodiments, the computer system 500 may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT$^R$, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT$^R$ exchange, Post Office Protocol (POP), Simple Mail Transfer Protocol (SMTP), or the like. In some embodiments, the computer system 500 may implement a mail client stored program component. The mail client (not shown in Figure) may be a mail viewing application, such as APPLE$^R$ MAIL™, MICROSOFT$^R$ ENTOURAGE™, MICROSOFT$^R$ OUTLOOK™, MOZILLA$^R$ THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

Embodiments of the present disclosure considers the keystroke level events for the process flows associated with the process. Hence, the process flow performed by each user are analyzed at granular level.

In the present disclosure, the similarity between the subtasks is based on the attributes associated with the events in the subtasks. The distance between the events of the subtasks is determined. Hence, the similarity is based on the distance, and not based on only whether the subtasks are same as each other. The similarity of the subtasks for clustering is performed by considering embedded information in the subtasks i.e., by determining the attributes of the subtasks. Hence, the analysis is further granularized.

In the present disclosure, determining the subtasks is based on the sub tasking rules. Hence, similar events, repeatable events, and the like is also considered when determining the subtasks.

The present disclosure provides methods of sampling the keystroke level events and determining the subtasks until an optimal percentage of sub tasking is performed. Hence, the sub tasking can be stopped when the optimal percentage of sub tasking is performed. This reduces time and computational complexity in determining the subtasks.

The present disclosure provides methods to update the determined subtasks and the clusters by evaluating certain parameters. Hence, the accuracy in determining the subtasks and the clusters is increased.

Further, the present disclosure provides methods to analyze the one or more process flows to determine an optimal process flow. The optimal process flow can be analyzed to get useful insights about the process performed by each of the user in the computing system. The analysis of the process flows is used to determine error associated the process flows, comparison of the process flows, and the like.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the technology.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the technology need not include the device itself The illustrated operations of FIG. 3 and FIG. 4 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the technology be limited not by this detailed description, but rather by any claims that issue on an application based here on. Accordingly, the disclosure of the embodiments of the technology is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for process flow analysis, the method comprising:
   receiving, by an analysis system, a plurality of keystroke level events for each of a plurality of process flows associated with a process performed in a computing system;
   determining, by the analysis system, one or more subtasks for each of the plurality of process flows, wherein a subtask from the one or more subtasks comprises a set of events occurring together in the plurality of keystroke level events of the corresponding process flow;
   grouping, by the analysis system, one or more process flows from the plurality of process flows to form one or more clusters, based on the one or more subtasks, wherein each cluster from the one or more clusters comprises the one or more process flows with similar subtasks;
   determining, by the analysis system, a mean similarity score for each of the one or more process flows in each of the one or more clusters;
   identifying, by the analysis system, one of the one or more process flows in each of the one or more clusters to be an optimal process flow when the mean similarity score for the one of the one or more process flows is greater than the mean similarity score of other of the one or more process flows in the corresponding cluster; and
   outputting, by the analysis system, an indication of the optimal process flow for each of the one or more clusters.

2. The method as claimed in claim 1, wherein determining the one or more subtasks comprises:
   identifying a frequency of occurrence of the set of events in the plurality of keystroke level events;
   determining a number of events in the set of events; and
   identifying the set of events to be the one or more subtasks, based on the frequency of occurrence, the number of events and one or more sub tasking rules.

3. The method as claimed in claim 2, wherein the set of events is identified to be the subtask when the frequency of occurrence is greater than a first pre-defined threshold value, the number of events in the set of events is greater than a second pre-defined threshold value and the one or more sub tasking rules are satisfied for the set of events.

4. The method as claimed in claim 2, wherein the one or more sub tasking rules comprises at least one of an order of occurrence of the events in the set of events, occurrence of similar events prior to the set of events, occurrence of similar events subsequent to the set of events or repeatability of an event in the set of events.

5. The method as claimed in claim 1, wherein grouping the one or more process flows based on the one or more subtasks comprises:
   determining one or more attributes associated with each event in the set of events of each of the one or more subtasks;
   determining a distance between each event in the set of events of a subtask and other subtasks among the one or more subtasks, based on a similarity of the one or more attributes; and
   grouping the one or more process flows when the distance between the subtasks of the one or more process flows is lesser than a pre-determined value.

6. The method as claimed in claim 5, wherein the one or more attributes related to an event comprises at least one of a type of the event, an execution time associated with the event, or an application on which the event is performed.

7. The method as claimed in claim 1, wherein determining the mean similarity score for the one of the one or more process flows process flow comprises:
   pairing the one of the one or more process flows with each of the other of the one or more process flows, to form one or more process flow pairs;
   determining pairwise similarity scores between process flows for each of the one or more process flow pairs; and
   averaging the pairwise similarity scores to determine the mean similarity score for the one of the one or more process flows.

8. The method as claimed in claim 1, wherein determining the one or more subtasks comprises:
   sampling the plurality of keystroke level events to form a plurality of sampled event sets, wherein a sampled event set comprises one or more keystroke level events from the plurality of keystroke level events; and
   determining the one or more subtasks for each of the plurality of sampled event sets, wherein determining the one or more subtasks is performed until an optimal percentage of sub tasking is performed.

9. The method as claimed in claim 1, further comprises, upon determining the one or more subtasks:
   updating the determined one or more subtasks based on at least one of coverage of the plurality of keystroke level events in the one or more subtasks, average length of the one or more subtasks, or one or more dissimilar events in the one or more subtasks.

10. The method as claimed in claim 1, further comprises, upon grouping the one or more process flows:
    updating the one or more clusters based on at least one of coverage of the one or more subtasks in the one or more clusters, a number of the one or more clusters, similarity between the one or more process flows in each of the one or more clusters, average length associated with the one or more clusters, a standard deviation of the length associated with the one or more clusters, or one or more inputs from a user.

11. An analysis system, comprising:
    one or more processors; and a memory, wherein the memory stores processor-executable instructions, which, on execution, cause the one or more processors to:
  receive a plurality of keystroke level events for each of a plurality of process flows associated with a process performed in a computing system;
  determine one or more subtasks for each of the plurality of process flows, wherein a subtask from the one or more subtasks comprises a set of events occurring together in the plurality of keystroke level events of the corresponding process flow;
  group one or more process flows from the plurality of process flows to form one or more clusters, based on the one or more subtasks, wherein each cluster from the one or more clusters comprises the one or more process flows with similar subtasks;
  determine a mean similarity score for each of the one or more process flows in each of the one or more clusters;
  identify one of the one or more process flows in each of the one or more clusters to be an optimal process flow when the mean similarity score for the one of the one or more process flows is greater than the mean similarity score of other of the one or more process flows in the corresponding cluster; and
  output an indication of the optimal process flow for each of the one or more clusters.

12. The analysis system as claimed in claim 11, wherein the processor-executable instructions, on execution, further cause the one or more processors to:
  identify a frequency of occurrence of the set of events in the plurality of keystroke level events;
  determine a number of events in the set of events; and
  identify the set of events to be the one or more subtasks, based on the frequency of occurrence, the number of events and one or more sub tasking rules.

13. The analysis system as claimed in claim 12, wherein the processor-executable instructions, on execution, further cause the one or more processors to identify the set of events to be the subtask when the frequency of occurrence is greater than a first pre-defined threshold value, the number of events in the set of events is greater than a second pre-defined threshold value and the one or more sub tasking rules are satisfied for the set of events.

14. The analysis system as claimed in claim 12, wherein the one or more sub tasking rules comprises at least one of an order of occurrence of the events in the set of events, occurrence of similar events prior to the set of events, occurrence of similar events subsequent to the set of events, or repeatability of an event in the set of events.

15. The analysis system as claimed in claim 11, wherein the processor-executable instructions, on execution, further cause the one or more processors to:
  determine one or more attributes associated with each event in the set of events of each of the one or more subtasks;
  determine a distance between each event in the set of events of a subtask and other subtasks among the one or more subtasks, based on a similarity of the one or more attributes; and
  group the one or more process flows when the distance between the subtasks of the one or more process flows is lesser than a pre-determined value.

16. The analysis system as claimed in claim 15, wherein the one or more attributes related to an event comprises at least one of a type of the event, an execution time associated with the event, or an application on which the event is performed.

17. The analysis system as claimed in claim 11, wherein the processor-executable instructions, on execution, further cause the one or more processors to:
  pair the one of the one or more process flows with each of the other of the one or more process flows, to form one or more process flow pairs;
  determine pairwise similarity scores between process flows for each of the one or more process flow pairs; and
  average the pairwise similarity scores to determine the mean similarity score for the one of the one or more process flows.

18. The analysis system as claimed in claim 11, wherein the processor-executable instructions, on execution, further cause the one or more processors to:
  sample the plurality of keystroke level events to form a plurality of sampled event sets, wherein a sampled event set comprises one or more keystroke level events from the plurality of keystroke level events; and
  determine the one or more subtasks for each of the plurality of sampled event sets, wherein determining the one or more subtasks is performed until an optimal percentage of sub tasking is performed.

19. The analysis system as claimed in claim 11, wherein the processor-executable instructions, on execution, further cause the one or more processors to, upon determining the one or more subtasks:
  update the determined one or more subtasks based on at least one of coverage of the plurality of keystroke level events in the one or more subtasks, average length of the one or more subtasks, or one or more dissimilar events in the one or more subtasks.

20. The analysis system as claimed in claim 11, wherein the processor-executable instructions, on execution, further cause the one or more processors to, upon grouping the one or more process flows:
  update the one or more clusters based on at least one of coverage of the one or more subtasks in the one or more clusters, a number of the one or more clusters, similarity between the one or more process flows in each of the one or more clusters, average length associated with the one or more clusters, a standard deviation of the length associated with the one or more clusters, or one or more inputs from a user.

21. A non-transitory computer readable medium having stored thereon instructions for process flow analysis, the non-transitory computer readable medium comprising machine executable code which when executed by at least one processor, causes the at least one processor to:
  receive a plurality of keystroke level events for each of a plurality of process flows associated with the process;
  determine one or more subtasks for each of the plurality of process flows, wherein a subtask from the one or more subtasks comprises a set of events occurring together in the plurality of keystroke level events of the corresponding process flow;
  group one or more process flows from the plurality of process flows to form one or more clusters, based on the one or more subtasks, wherein each cluster from the one or more clusters comprises the one or more process flows with similar subtasks;
  determine a mean similarity score for each of the one or more process flows in each of the one or more clusters;

identify one of the one or more process flows in each of the one or more clusters to be an optimal process flow when the mean similarity score for the one of the one or more process flows is greater than the mean similarity score of other of the one or more process flows in the corresponding cluster; and output an indication of the optimal process flow for each of the one or more clusters.

\* \* \* \* \*